US 6,685,364 B1

(12) United States Patent
Brezina et al.

(10) Patent No.: US 6,685,364 B1
(45) Date of Patent: Feb. 3, 2004

(54) ENHANCED FOLDED FLEXIBLE CABLE PACKAGING FOR USE IN OPTICAL TRANSCEIVERS

(75) Inventors: Johnny R. Brezina, Austin, TX (US); Brian M. Kerrigan, Austin, TX (US); Gerald D. Malagrino, Jr., Rochester, MN (US); James R. Moon, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 10/006,836

(22) Filed: Dec. 5, 2001

(51) Int. Cl.[7] .................................................. G02B 6/36
(52) U.S. Cl. .............................. 385/92; 385/76; 385/88; 385/89; 385/91; 398/135
(58) Field of Search .............................. 385/53, 88, 91, 385/92, 76, 89; 359/152; 398/135

(56) References Cited

U.S. PATENT DOCUMENTS

| | | | | | |
|---|---|---|---|---|---|
| 5,416,872 | A | * | 5/1995 | Sizer et al. | 385/92 |
| 6,163,642 | A | * | 12/2000 | Huppenthal | 385/138 |
| 6,318,909 | B1 | * | 11/2001 | Giboney et al. | 385/90 |
| 6,459,842 | B1 | * | 10/2002 | Arsenault et al. | 385/134 |
| 6,547,452 | B1 | * | 4/2003 | Chan et al. | 385/88 |
| 6,583,902 | B1 | * | 6/2003 | Yuen | 398/135 |
| 2002/0122636 | A1 | * | 9/2002 | Anderson et al. | 385/89 |
| 2003/0026553 | A1 | * | 2/2003 | Stack | 385/88 |
| 2003/0053767 | A1 | * | 3/2003 | Cheng et al. | 385/89 |

OTHER PUBLICATIONS

U.S. Patent Application entitled "Packaging Architecture for a Multiple Array Transceiver Using a Continuous Flexible Circuit", (Inventors Johnny R. Brezina, et al.).

U.S. Patent Application entitled "Flexible Cable Stiffener for an Optical Transceiver", (Inventors Johnny R. Brezina, et al.).

U.S. Patent Application entitled "Packaging Architecture for a Multiple Array Transceiver Using a Flexible Cable", (Inventors Johnny R. Brezina, et al.).

U.S. Patent Application entitled "Packaging Architecture for a Multiple Array Transceiver Using a Flexible Cable and Stiffener for Customer Attachment", (Inventors Johnny R. Brezina, et al.).

U.S. Patent Application entitled "Packaging Architecture for a Multiple Array Transceiver Using a Winged Flexible Cable for Optimal Wiring", (Inventors Johnny R. Brezina, et al.).

U.S. Patent Application entitled "Horizontal Carrier Assembly for Multiple Array Optoelectronic Devices", (Inventors Johnny R. Brezina, et al.).

* cited by examiner

*Primary Examiner*—Brian Healy
*Assistant Examiner*—Daniel Petkovsek
(74) *Attorney, Agent, or Firm*—Cardinal Law Group; Casimer K. Salys

(57) ABSTRACT

The enhanced folded flexible cable packaging for use in optical transceivers of the present invention provides a 90 degree transition between an optical signal input/output at a communication chassis bulkhead, and folds 180 degrees around a horizontal heat spreader to provide the capability to wire electrical components to the flexible cable while maintaining the upper surface of the electrical components in close proximity to a heat sink. This allows signals to be processed through a multi-layer flexible cable providing electrical performance without the mechanical stiffness associated with the bends that occur in the package. The multiple array transceiver makes the 90 degree transition within a narrow gap established by industry and manufacturing standards. The multiple array transceiver also provides cooling to the internal electronics through a heat sink attached to the flexible cable and the heat spreader, which concurrently mounts and locates the transceiver to a common host board.

21 Claims, 5 Drawing Sheets

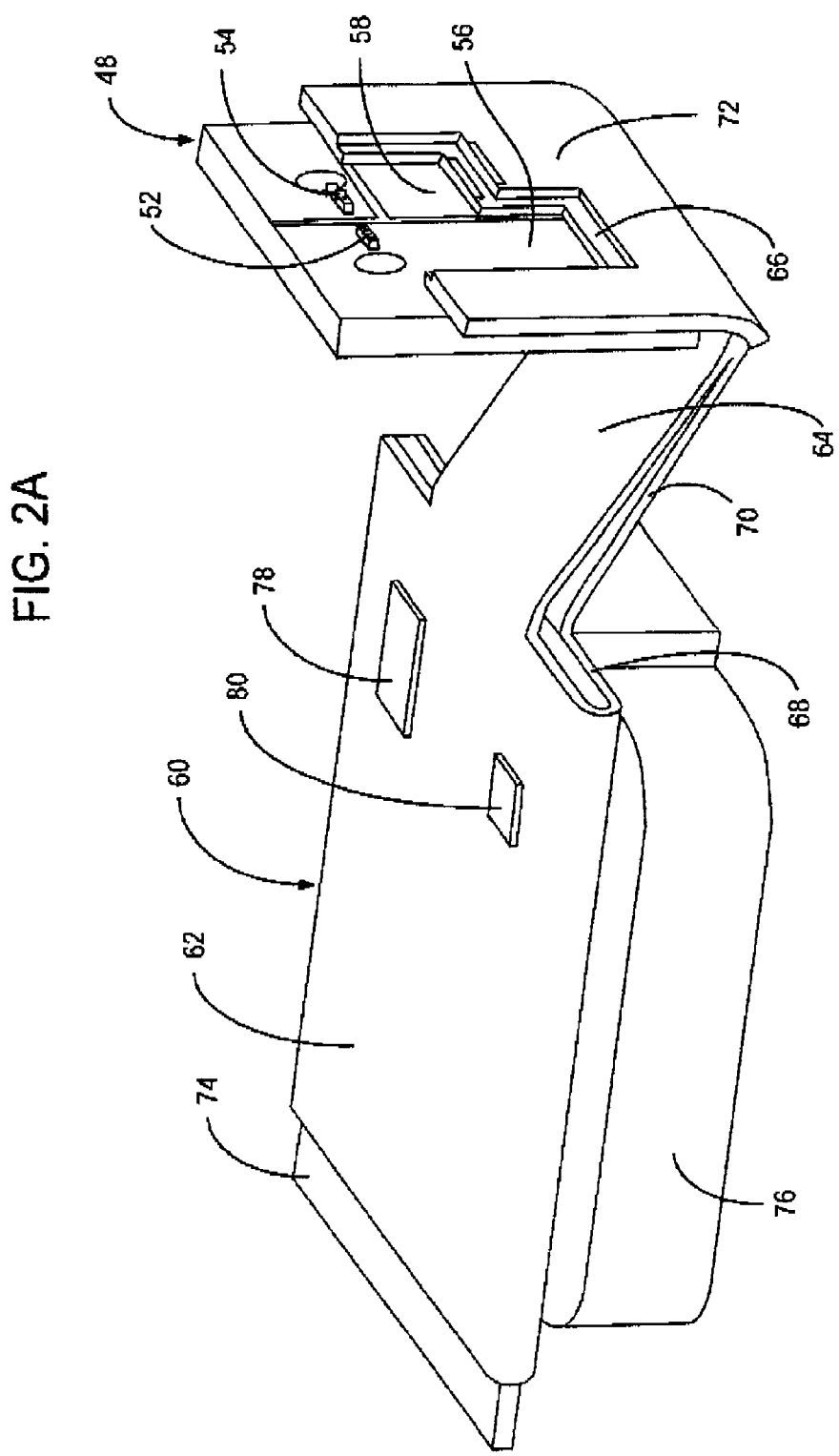

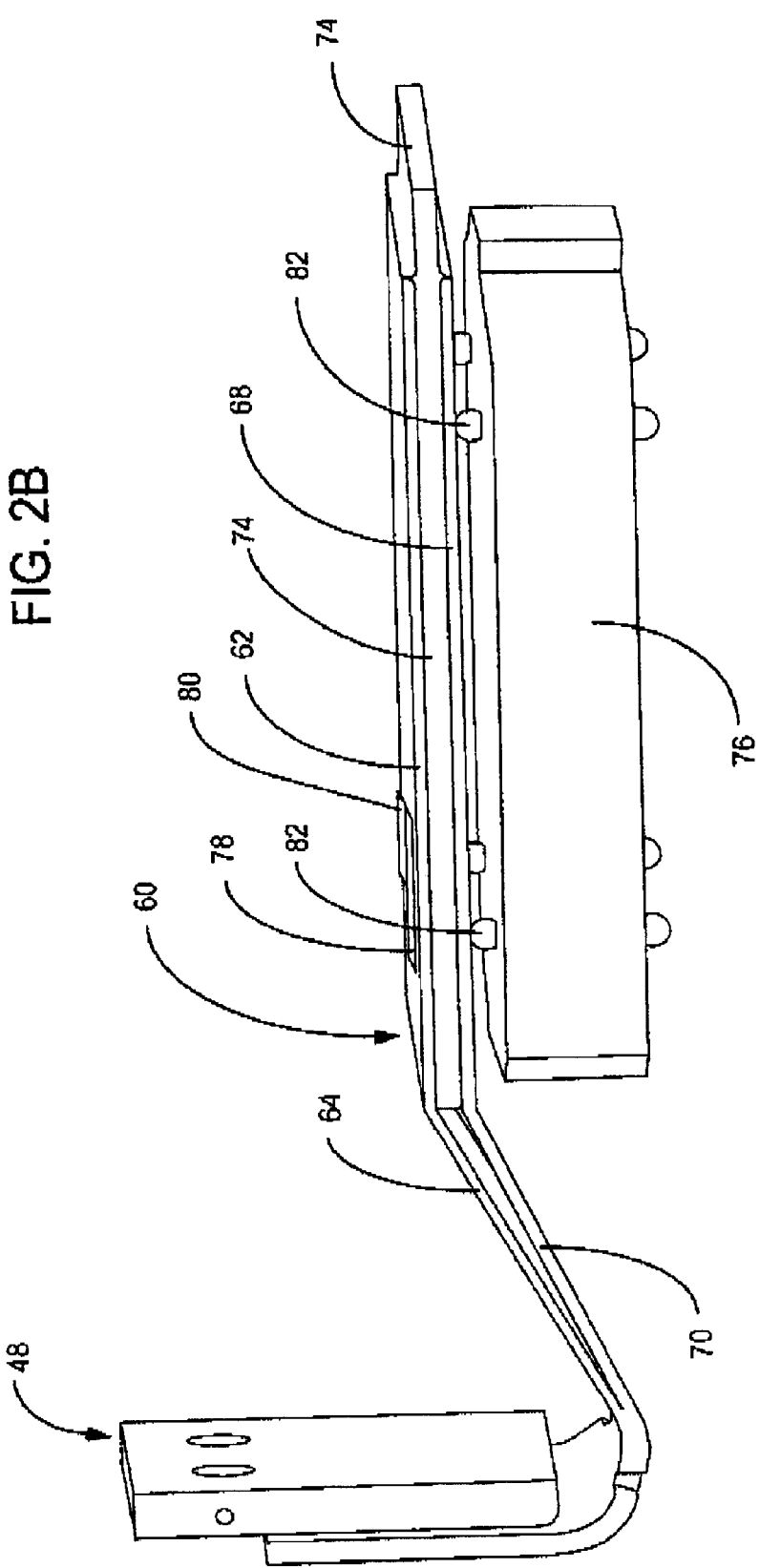

ENHANCED FOLDED FLEXIBLE CABLE PACKAGING FOR USE IN OPTICAL TRANSCEIVERS

RELATED APPLICATIONS

This application claims priority to U.S. patent application Ser. No. 09/956,771 filed on Sep. 20, 2001 entitled "Fiber Optic Transceiver, Connector, And Method of Dissipating Heat" by Johnny R. Brezina, et al., the entire disclosure of which is incorporated by reference, herein.

This application also relates to the following applications, filed concurrently herewith:

"Optical Alignment In A Fiber Optic Transceiver", by Johnny R. Brezina, et al. Ser. No. 10/007,027 filed Nov. 5, 2001, pending;

"External EMI Shield For Multiple Array Optoelectronic Devices", by Johnny R. Brezina, et al. Ser. No. 10/006,644 filed Nov. 5, 2000, pending;

"Packaging Architecture For A Multiple Array Transceiver Using A Continuous Flexible Circuit", by Johnny R. Brezina, et al. Ser. No. 10/007,026 filed Nov. 5, 2001, pending;

"Flexible Cable Stiffener for An Optical Transceiver", by Johnny R. Brezina, et al. U.S. Pat. No. 6,614,658, issued Sep. 2, 2003.

"Apparatus and Method for Controlling an Optical Transceiver", by Johnny R. Brezina, et al. Ser. No. 10/007,024 filed Nov. 5 2001, pending;

"Internal EMI Shield for Multiple Array Optoelectronic Devices," by Johnny R. Brezina, et. al. Ser. No. 10/006,834 filed Nov. 5, 2001, pending;

"Multiple Array Optoelectronic Connector with Integrated Latch", by Johnny R. Brezina, et al. Ser. No. 10/007,023 filed Nov. 5, 2001, pending;

"Mounting a Lens Array in a Fiber Optic Transceiver", by Johnny R. Brezina, et al. Ser. No. 10/006,837 filed Nov. 5, 2001, pending;

"Packaging Architecture for a Multiple Array Transceiver Using a Flexible Cable", by Johnny R. Brezina, et al. Ser. No. 10/006,835 filed Nov. 5, 2001, pending;

"Packaging Architecture for a Multiple Array Transceiver Using a Flexible Cable and Stiffener for Customer Attachment", by Johnny R. Brezina, et al. Ser. No. 10/006,838 filed Nov. 5, 2001, pending;

"Packaging Architecture for a Multiple Array Transceiver Using a Winged Flexible Cable for Optimal Wiring", by Johnny R. Brezina, et al. Ser. No. 10/006,839 filed Nov. 5, 2001, pending; and "Horizontal Carrier Assembly for Multiple Array Optoelectronic Devices", by Johnny R. Brezina, et al. Ser. No. 10/007,215 filed Nov. 5, 2001, pending.

TECHNICAL FIELD

The technical field of this disclosure is computer systems, particularly, enhanced folded flexible cable packaging for use in optical transceivers.

BACKGROUND OF THE INVENTION

Optical signals entering a communications chassis can be converted to electrical signals for use within the communications chassis by a multiple array transceiver. The configuration of optical signal connections entering the communications chassis and the circuit boards within the chassis require a 90-degree direction change in signal path from the optical to the electrical signal. This 90-degree configuration is required due to the right angle orientation between the customer's board and the rear bulkhead of the chassis. Existing multiple array transceiver designs use a number of small parts, such as tiny flexible interconnects with associated circuit cards and plastic stiffeners, to make the 90-degree transition. The size and number of the parts increases manufacturing complexity and expense.

In addition, existing multiple array transceivers are limited in the number of electrical signal paths they can provide between the optical input and the customer's board. It is desirable to provide as many electrical signal paths as possible, because optical fiber can typically provide a greater information flow rate than electrical wire. Industry and company standards further limit the space available for signal paths from the optical input to the customer's board, limiting the space to a narrow gap.

Thermal considerations may also limit the signal carrying capacity of current multiple array transceivers. Heat is generated by electrical resistance as the signals pass through the conductors and as the signals are processed by solid-state chips within the transceivers. Limitations on heat dissipation can limit the data processing speed and reduce transceiver reliability.

It would be desirable to have a packaging architecture for a multiple array transceiver using a folded flexible cable that would overcome the above disadvantages.

SUMMARY OF THE INVENTION

The enhanced folded flexible cable packaging for use in optical transceivers of the present invention provides a 90 degree transition between an optical signal input/output at a communication chassis bulkhead, and folds 180 degrees around a horizontal heat spreader to provide the capability to wire electrical components to the flexible cable while maintaining the upper surface of the electrical components in close proximity to a heat sink. This allows signals to be transmitted through a multi-layer flexible cable without the mechanical stiffness associated with the bends that occur in conventional optical transceiver packaging. The packaging architecture system for a transceiver comprises a forward vertical carrier having an optical converter; a rearward horizontal I/O block, the rearward horizontal I/O block oriented about 90 degrees from the forward vertical carrier; and a flexible cable operably connected between the forward vertical carrier and the rearward horizontal I/O block, the flexible cable being folded to provide a first signal path and a second signal path. The multiple array transceiver makes the 90 degree transition within a narrow gap established by industry and manufacturing standards. The multiple array transceiver also provides cooling to the internal electronics through a heat sink attached to the flexible cable and the heat spreader, which concurrently mounts and locates the transceiver to a common host board.

One aspect of the present invention provides a packaging architecture for a multiple array transceiver providing a 90-degree transition between the customer's board and the rear bulkhead of the chassis.

Another aspect of the present invention provides a packaging architecture for a multiple array transceiver with a reduced number of components for manufacturing ease and reduced cost.

Another aspect of the present invention provides a packaging architecture for a multiple array transceiver providing an interconnection containing a very large number of signal paths in a narrow horizontal gap.

Another aspect of the present invention provides a packaging architecture for a multiple array transceiver providing a thermally efficient design with heat flow to the heat sink split into two distinct parallel paths.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIGS. 2A & 2B show isometric diagrams of a forward vertical carrier in place in an I/O assembly made in accordance with the present invention.

DESCRIPTION OF THE PREFERRED EMBODIMENT

The enhanced folded flexible cable packaging for use in optical transceivers of the present invention provides a 90-degree transition between an optical signal input at a communications chassis bulkhead and an interior board within the communications chassis. The multiple array transceiver makes the 90-degree transition within a narrow gap established by industry and manufacturer standards. The multiple array transceiver further provides parallel cooling paths through a heat sink.

The present invention is shown and described by the following description and figures, and is generally described in the order in which the individual components are assembled during manufacture.

Figure 1:
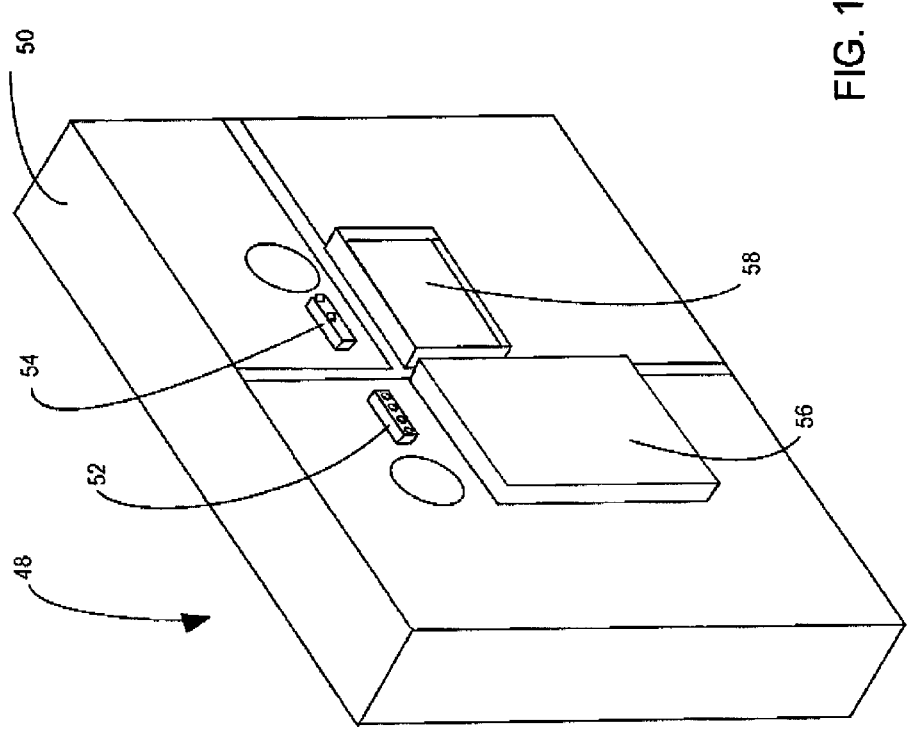
FIG. 1 shows an isometric diagram of a forward vertical carrier made in accordance with the present invention.

FIG. 1 shows an isometric diagram of a forward vertical carrier made in accordance with the present invention. The forward vertical carrier 48 comprises common substrate carrier 50, laser die 52, photodetector die 54, laser drive amplifier (LDA) 56, and transimpedance amplifier (TIA) 58. Laser die 52 and photodetector die 54 are attached to a common substrate carrier 50 by using standard die bond epoxy material and technique as will be appreciated by those skilled in the art. The LDA 56 and TIA 58 are also die bonded to the substrate carrier 50 in close proximity to the laser die 52 and photodetector die 54 to provide short critical transmission interconnection wire bond lengths. The TIA 58 acts as the photodetector interface chip. The laser die 52 and photodetector die 54 are precisely aligned to provide optimum communication with a fiber optic cable which can be attached to the laser die 52 and photodetector die 54.

The laser die 52 and photodetector die 54 with their associated circuits perform as optical converters to convert a light signal coming into the transceiver to an electrical signal or convert an electrical signal from the transceiver to a light signal. In one embodiment, the optical converters can be lasers only, so that the transceiver only transmits optical signals. In another embodiment, the optical converters can be photodetectors only, so that the transceiver only receives optical signals. In other embodiments, the number of lasers and photodetectors can be predetermined to meet the number of transmit and receive channels desired.

FIGS. 2A & 2B, in which like elements have like reference numbers, show isometric diagrams of a forward vertical carrier in place in an I/O assembly made in accordance with the present invention. A flexible cable is folded along its length to increase the data transfer capability between the forward vertical carrier and a rearward horizontal I/O block, while increasing the cooling capability by folding the flexible cable around a heat spreader.

A flexible cable 60 comprises a first signal path having a first electrical portion 62, a first transfer portion 64, and a first optical portion 66; and a second signal path having a second electrical portion 68, a second transfer portion 70, and a second optical portion 72. The flexible cable 60 has two signal paths due to the folded design, which electrically connects the rearward horizontal I/O block 76 to the forward vertical carrier 48, where the laser die 52 and photodetector die 54 are located. Each signal path can contain a plurality of conductors carrying a plurality of signals. The first and second signal paths can be routed on top of each other through a narrow gap. This allows the J-shaped interconnection between the rearward horizontal I/O block 76 and forward vertical carrier 48 to contain a very large number of signals in a narrow horizontal gap.

The first optical portion 66 can be bonded with adhesive to the forward vertical carrier 48 and the second optical portion 72 bonded to the first optical portion 66. The first optical portion 66 and the second optical portion 72 can be terminated in a profile around the LDA 56 and TIA 58 to match the shape of the LDA 56 and TIA 58 to provide ease of connection. The second optical portion 72 can be further stepped back with respect to the first optical portion 66 to further increase the area for electrical connection. The first optical portion 66 and the second optical portion 72 have bond pads in the area around the LDA 56 and TIA 58 to allow wire bonding to the dies. Wire bond pads are exposed on both the first optical portion 66 and the second optical portion 72 and are ribbon bonded directly to the respective LDA 56 and TIA 58. The wire bond pads can also provide interconnect capability between the conductors in the first optical portion 66 and the second optical portion 72.

Referring to FIG. 2B, the flexible cable 60 has a folded shape, which provides the first electrical portion 62 above a heat spreader 74 and the second electrical portion 68 below the heat spreader 74. The second electrical portion 68 is soldered to the I/O block 76 on the underside of the heat spreader 74. If desired, interconnecting circuit traces can be routed through the solder ball array 82 to connect the receiver post amplifier 78, eeprom 80, and the I/O block 76. Further connections can be made between the first electrical portion 62 and the second electrical portion 68 with circuits passing through the bend connecting the first electrical portion 62 and the second electrical portion 68 where the flexible cable 60 wraps around the heat spreader 74. The receiver post amplifier 78 and eeprom 80 dissipate heat into the heat spreader 74, which in turn is connected to a heat sink.

Figure 3A:
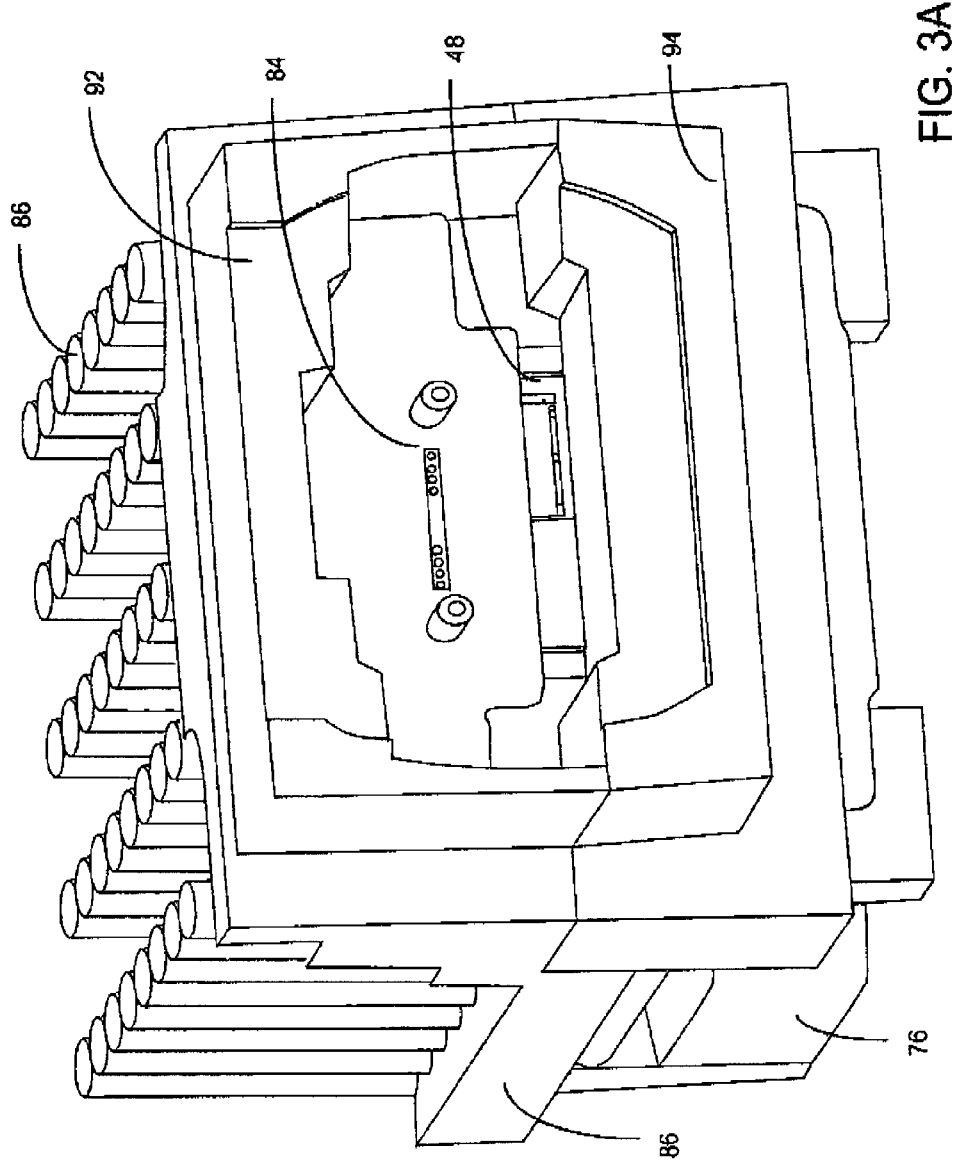
FIGS. 3A & 3B show isometric diagrams of a packaging architecture for a multiple array transceiver using a folded flexible cable made in accordance with the present invention.
Figure 3B:
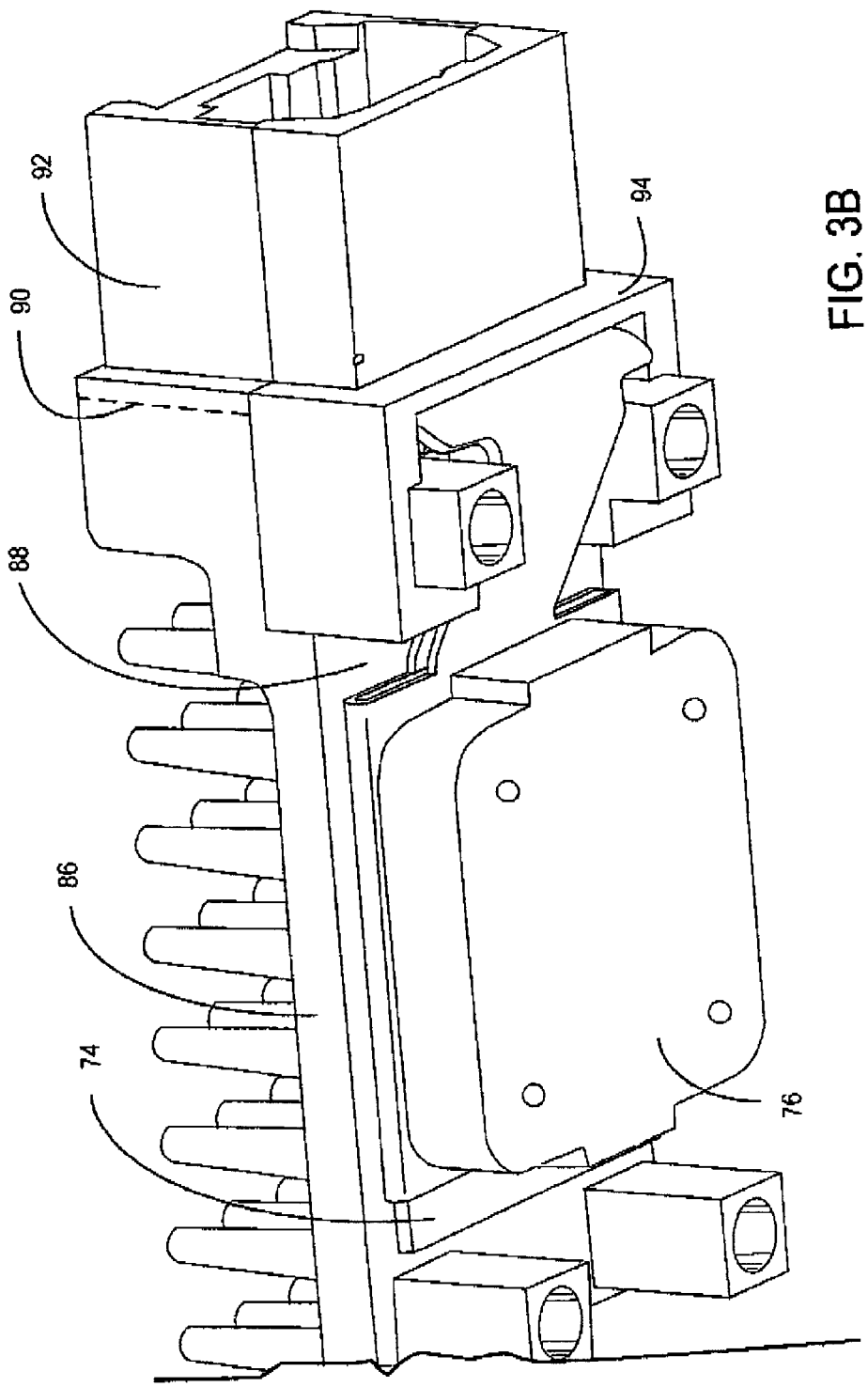

FIGS. 3A & 3B, in which like elements have like reference numbers, show isometric diagrams of a packaging architecture for a multiple array transceiver using a folded flexible cable made in accordance with the present invention.

Referring to FIG. 3A, the optical lens assembly 84 is aligned and UV epoxy bonded to the forward vertical carrier 48. Precise alignment provides efficient optical signal transfer.

Referring to FIG. 3B, heat sink 86 incorporates a vertically oriented surface 90 to which the forward vertical carrier 48 can be attached, and a horizontal surface 88 to which the heat spreader 74 can be attached. The attachment can be made with adhesive, thermally conductive epoxy, or the like, as will be appreciated by those skilled in the art. The heat sink 86 can be made of any material with high thermal conductivity, such as aluminum or copper, and can be formed by various processes, such as die casting or machining. The attachment to the vertically oriented surface 90 and the horizontal surface 88 provides the 90-degree angle between the forward vertical carrier and the I/O block 76. The flexible cable 60 bends to provide the electrical connection between the vertical and horizontal portions. This 90-degree configuration is required due to the right angle orientation between the customer's interior circuit board and the rear bulkhead of the chassis.

The connection of the heat sink 86 to the heat spreader 74 provides heat transfer beyond the heat transfer from the forward vertical carrier to the heat sink 86 alone. This creates a thermally efficient design, since heat flow through the heat sink 86 is split into two distinct parallel paths: one path from the forward vertical carrier to the heat sink 86 near the forward vertical carrier and a second path from the heat spreader 74 to the portion of the heat sink 86 away from the forward vertical carrier. The receiver post amplifier and eeprom dissipate heat into the heat spreader. The heat sink 86 can have fins, pins, vanes, passive cooling, or active cooling on the open surface to assist in heat transfer.

The heat sink 86 further comprises an upper retainer shell 92 to house a fiberoptic connector (not shown). After the forward vertical carrier 48 has been assembled onto the heat sink 86, a lower retainer shell 94 is attached to the upper retainer shell 92. In one embodiment, the lower retainer shell 94 can be attached to the upper retainer shell 92 with two screws, which also pass through the customer board at specified hole locations to structurally anchor the lower retainer shell 94 to the customer board. An EMI assembly clip (not shown) can be slid over the upper retainer shell 92 and the lower retainer shell 94. The EMI assembly clip can provide both EMI and ground connection points to the customer chassis bulkhead.

This completes the assembly of the multiple array transceiver module. The module can be attached to the customer's board by connecting the I/O block 76 to the mating connector on the customer's board, and securing four screws from the back side of the customer's board into mounting screw locations on the heat sink 86 and the lower retainer shell 94. A ball grid array on the I/O block 76 normally connects to a complementary array on customer's board.

It is important to note that the figures and description illustrate specific applications and embodiments of the present invention, and is not intended to limit the scope of the present disclosure or claims to that which is presented therein. While the figures and description present a 2.5 gigahertz, 4 channel transmit and 4 channel receive multiple array transceiver, the present invention is not limited to that format, and is therefore applicable to other array formats including dedicated transceiver modules, dedicated receiver modules, and modules with different numbers of channels. For example, other embodiments can include multiple in-line lasers and receivers or arrays of lasers and receivers, e.g., 8×8 or 16×16 grids. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A packaging architecture system for a transceiver comprising:
    a forward vertical carrier having an optical converter;
    a rearward horizontal I/O block, the rearward horizontal I/O block oriented about 90 degrees from the forward vertical carrier;
    a flexible cable operably connected between the forward vertical carrier and the rearward horizontal I/O block, the flexible cable folded lengthwise to form a first electrical portion and a second electrical portion, the first electrical portion and the second electrical portion defining a cavity therebetween; and
    a heat spreader disposed in the cavity.

2. The system of claim 1 wherein the optical converter is at least one laser.

3. The system of claim 1 wherein the optical converter is at least one photodetector.

4. The system of claim 1 further comprising an electronic component die thermally connected to the forward vertical carrier.

5. The system of claim 1 further comprising a heat sink thermally connected to the forward vertical carrier.

6. The system of claim 1 further comprising a heat sink thermally connected to the heat spreader.

7. The system of claim 1 further comprising an electronic component die thermally connected to the heat spreader.

8. A packaging architecture system for a transceiver comprising:
    first means for supporting an optical converter;
    second means for supporting an I/O block, the second supporting means oriented about 90 degrees from the first supporting means;
    means for electrically connecting the optical converter and the I/O block, the electrical connecting means folded lengthwise to form a first electrical portion and a second electrical portion, the first electrical portion and the second electrical portion defining a cavity therebetween; and
    a means for spreading heat disposed in the cavity.

9. The system of claim 8 wherein the optical converter is at least one laser.

10. The system of claim 8 wherein the optical converter is at least one photodetector.

11. The system of claim 8 further comprising an electronic component die thermally connected to the first supporting means.

12. The system of claim 8 further comprising means for removing heat thermally connected to the first supporting means.

13. The system of claim 8 further comprising means for removing heat thermally connected to the heat spreading means.

14. The system of claim 8 further comprising an electronic component die thermally connected to the heat spreading means.

15. A packaging architecture system for a transceiver comprising:
    a heat sink, the heat sink having a first surface and a second surface, the first surface being oriented about 90 degrees from the second surface;

a forward vertical carrier having an optical converter, the forward vertical carrier being attached to the first surface of the heat sink;

a rearward horizontal I/O block, the rearward horizontal I/O block being attached to the second surface of the heat sink;

a flexible cable operably connected between the forward vertical carrier and the rearward horizontal I/O block, the flexible cable folded lengthwise to form a first electrical portion and a second electrical portion, the first electrical portion and the second electrical portion defining a cavity therebetween; and a heat spreader, the heat spreader being disposed in the cavity, the heat spreader being attached to the heat sink.

16. The system of claim 15 wherein the optical converter comprises at least one laser.

17. The system of claim 15 wherein the optical converter is at least one photodetector.

18. The system of claim 15 further comprising an electronic component die thermally connected to the forward vertical carrier.

19. The system of claim 18 wherein the electronic component is selected from the group consisting of a laser drive amplifier and a transimpedance amplifier.

20. The system of claim 15 further comprising an electronic component die thermally connected to the heat spreader.

21. The system of claim 20 wherein the electronic component is selected from the group consisting of a receiver post amplifier and an eeprom.

* * * * *